US008755277B2

(12) United States Patent
Banerjee et al.

(10) Patent No.: US 8,755,277 B2
(45) Date of Patent: *Jun. 17, 2014

(54) DIFFERENTIATED SERVICES FOR UNICAST AND MULTICAST FRAMES IN LAYER 2 TOPOLOGIES

(75) Inventors: Ayan Banerjee, Fremont, CA (US); Dino Farinacci, San Jose, CA (US); Raghava Sivaramu, Sunnyvale, CA (US); Abhay Roy, Cupertino, CA (US); Nair Venugopal, Fremont, CA (US); Sanjay Sane, Fremont, CA (US)

(73) Assignee: Cisco Technology, Inc., San Jose, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 13/543,395

(22) Filed: Jul. 6, 2012

(65) Prior Publication Data

US 2012/0275347 A1 Nov. 1, 2012

Related U.S. Application Data

(63) Continuation of application No. 12/283,207, filed on Sep. 9, 2008, now Pat. No. 8,259,569.

(51) Int. Cl.
*G01R 31/08* (2006.01)
*H04L 12/28* (2006.01)

(52) U.S. Cl.
USPC .......................................... 370/230; 370/401

(58) Field of Classification Search
None
See application file for complete search history.

(56) References Cited

U.S. PATENT DOCUMENTS

| | | |
|---|---|---|
| 6,963,575 B1 | 11/2005 | Sistanizadeh et al. |
| 2003/0198182 A1 | 10/2003 | Pegrum et al. |
| 2005/0083949 A1 | 4/2005 | Dobbins et al. |
| 2005/0157645 A1 | 7/2005 | Rabie et al. |
| 2005/0163137 A1 | 7/2005 | Wakumoto et al. |
| 2006/0002370 A1 | 1/2006 | Rabie et al. |
| 2006/0098589 A1 | 5/2006 | Kreeger et al. |
| 2006/0209831 A1 | 9/2006 | Shepherd et al. |
| 2006/0245438 A1 | 11/2006 | Sajassi et al. |
| 2006/0268749 A1 | 11/2006 | Rahman et al. |
| 2007/0014256 A1 | 1/2007 | Le Faucheur et al. |
| 2007/0025276 A1 | 2/2007 | Zwiebel et al. |
| 2007/0165657 A1* | 7/2007 | Smith et al. .................. 370/401 |
| 2008/0165705 A1 | 7/2008 | Umayabashi et al. |

(Continued)

FOREIGN PATENT DOCUMENTS

EP     1 764 956     3/2007

OTHER PUBLICATIONS

Yujin Lim et al., "QoS-aware Multiple Spanning Tree Mechanism over a Bridged Lan Environment", Globecom 2003—IEEE Global Telecommunications Conference.

(Continued)

*Primary Examiner* — Eunsook Choi
(74) *Attorney, Agent, or Firm* — Cindy Kaplan

(57) ABSTRACT

In one embodiment, a method includes receiving information on layer 2 topologies at a network device in a core network, mapping one or more Virtual Local Area Networks (VLANs) to the layer 2 topologies to provide differentiated services in said layer 2 topologies, defining multiple paths for each of the layer 2 topologies, and forwarding a packet received at the network device on one of the multiple paths. An apparatus and logic for providing differentiated services in layer 2 topologies is also disclosed.

20 Claims, 6 Drawing Sheets

(56) References Cited

U.S. PATENT DOCUMENTS

| | | |
|---|---|---|
| 2008/0225853 A1 | 9/2008 | Melman et al. |
| 2009/0022070 A1* | 1/2009 | Iovanna et al. ............... 370/256 |
| 2009/0034540 A1 | 2/2009 | Law |
| 2009/0041019 A1* | 2/2009 | He et al. ..................... 370/392 |
| 2009/0052449 A1 | 2/2009 | Ramakrishnan et al. |
| 2009/0080345 A1 | 3/2009 | Gray |
| 2009/0213859 A1 | 8/2009 | De Silva et al. |
| 2009/0279536 A1 | 11/2009 | Unbehagen et al. |

OTHER PUBLICATIONS

Aref Meddeb et al., "Multiple Spanning Tree Generation and Mapping Algorithms for Carrier Class Ethernets", IEEE Global Telecommunications Conference, 2006.

Maher Ali et al. (Alcatel), "Traffic Engineering in Metro Ethernet", IEEE Network, IEEE Service Center, NY, vol. 19, No. 2, Mar. 1, 2005.

* cited by examiner

GRAPH T1

| DESTINATION SWITCH | NEXT-HOP OIF |
|---|---|
| 21 | 31 |
| 22 | 32 |
| 23 | 32 |

GRAPH T2

| DESTINATION SWITCH | NEXT-HOP OIF |
|---|---|
| 21 | 33 |
| 22 | 33 |
| 23 | 33 |

FIGURE 3

DIFFERENTIATED SERVICES FOR UNICAST AND MULTICAST FRAMES IN LAYER 2 TOPOLOGIES

RELATED APPLICATION

This patent application is a continuation of U.S. patent application Ser. No. 12/283,207, filed Sep. 9, 2008, which is incorporated herein by reference in its entirety.

BACKGROUND

The present disclosure relates generally to communication networks, and more particularly, to providing differentiated services for unicast and multicast frames in Layer 2 (L2) topologies.

In conventional L2 networks, frames in a particular VLAN (Virtual Local Area Network) obtain service based on trees set up by Spanning Tree Protocol (STP) or its variants (e.g., RSTP (Rapid Spanning Tree Protocol), MSTP (Multiple Spanning Tree Protocol)). STP and related protocols are distance-vector protocols, therefore, frames are routed along links in the network that belong to the tree. L2 frames cannot be sent along Equal Cost Multipaths (ECMPs), since a requirement of STP is to ensure that the trees remain loop-free.

Multicast in these conventional networks is serviced using snooping mechanisms such as IGMP (Internet Group Management Protocol) snooping and MLD (Multicast Listener Discovery) snooping, which learn the location of hosts interested in a specific multicast group or multicast group and source Layer 2/Layer 3 address along the spanning tree and forward traffic accordingly. These STP based trees are not able to provide multipath services for multicast frames within a given STP instance.

BRIEF DESCRIPTION OF THE DRAWINGS

FIG. 3 illustrates tables corresponding to the multicast graphs of FIG. 2.

Corresponding reference characters indicate corresponding parts throughout the several views of the drawings.

DESCRIPTION OF EXAMPLE EMBODIMENTS

Overview

In one embodiment, a method generally comprises receiving information on layer 2 topologies at a network device in a core network, mapping one or more Virtual Local Area Networks (VLANs) to the layer 2 topologies to provide differentiated services in said layer 2 topologies, defining multiple paths for each of the layer 2 topologies, and forwarding a packet received at the network device on one of the multiple paths.

In another embodiment, an apparatus generally comprises a database for storing information on layer 2 topologies, a database for storing mappings between the layer 2 topologies and one or more Virtual Local Area Networks (VLANs) to provide differentiated services in said layer 2 topologies, and a processor configured to compute multiple paths for each of the layer 2 topologies and forward packets on one of the multiple paths based on the VLAN associated with the packet.

Example Embodiments

The following description is presented to enable one of ordinary skill in the art to make and use the invention. Descriptions of specific embodiments and applications are provided only as examples and various modifications will be readily apparent to those skilled in the art. The general principles described herein may be applied to other embodiments and applications without departing from the scope of the invention. Thus, the present invention is not to be limited to the embodiments shown, but is to be accorded the widest scope consistent with the principles and features described herein. For purpose of clarity, details relating to technical material that is known in the technical fields related to the invention have not been described in detail.

Figure 1:
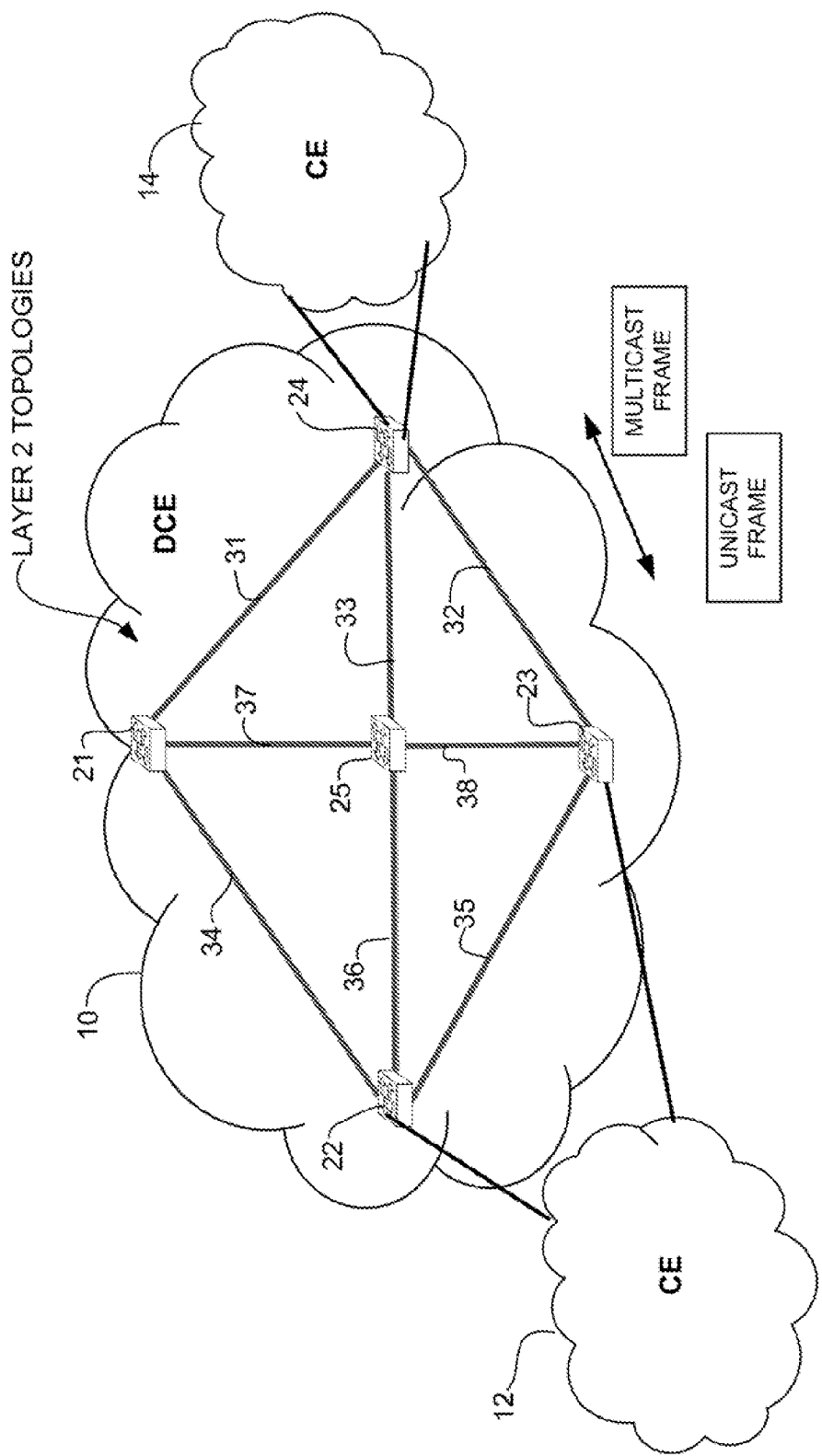
FIG. 1 illustrates an example of a network in which embodiments described herein may be implemented.

Referring now to the drawings, and first to FIG. 1, an example of a network that may implement embodiments described herein is shown. For simplification, only a small number of nodes are shown. The system operates in the context of a data communication network including multiple network elements. Some of the elements in a network that employs the system may be network devices such as switches, routers, gateways, or servers. The network device may include, for example, a master central processing unit (CPU), interfaces, and a bus. The CPU preferably includes memory and a processor. The network device may be implemented on a general purpose network machine such as described below with respect to FIG. 6.

In the example shown in FIG. 1, two CE (Classical Ethernet) networks 12, 14 are in communication with a DCE (Data Center Ethernet) network 10. The DCE network includes five switches 21, 22, 23, 24, 25 interconnected by links 31, 32, 33, 34, 35, 36, 37, 38. Edge switches 22 and 23 are in communication with CE network 12 and edge switch 24 is in communication with network 14. For simplification only two CE networks are shown. It is to be understood that the edge switches in the DCE network may be in communication with any number of CE networks. Also, the network shown in FIG. 1 is only one example and other types of networks having different components or topologies may be used without departing from the scope of the invention.

The DCE network 10 comprises a layer 2 network which uses Link State Protocols (LSPs) to learn unicast and multicast location and reachability information at layer 2. The layer 2 network appears as a "wire" to networks connected thereto. The L2 network control plane protocol supports the forwarding of frames between the connected networks. The embodiments described herein allow for the aggregation of Virtual Local Area Networks (VLANs) from the CE networks 12, 14 that need similar services from the L2 core network. The DCE network 10 may contain any number of topologies. A topology consists of a collection of nodes, interfaces, and metrics. Each topology allows for different metrics on the links to provide path diversity for network traffic. As described in detail below, L2 topologies are created and unicast and multicast frames are delivered within a topology across multiple paths in the L2 network core. The embodiments described herein aggregate a set of VLANs (referred to herein as a vlan-set), to an L2 topology and use a link state protocol to provide (1) ECMP (Equal Cost Multipath) for unicast frames and (2) multipath services (path diversity) for multicast frames in the topology. As a result, differentiated services are enabled on topologies that are associated with vlan-sets and hardware requirements are reduced, in terms of the number of entries no longer being VLAN granular, but instead topology granular.

Referring again to FIG. 1, packets from CE VLANs are mapped to a particular topology at the DCE network edge. Details of mapping the VLANs to topologies are described below. Once a packet is tagged to a particular topology, forwarding occurs in that topology. Frames from the CE network 12, 14 are encapsulated by a DCE header and sent over the DCE network 10. In one embodiment, a DCE IS-IS (Intermediate System to Intermediate System) control plane protocol supports the forwarding of these frames and nodes in the DCE network run IS-IS as the control plane protocol. Each node uses a unique system-ID for its control plane DCE IS-IS process. It is to be understood that IS-IS is used herein as one example and that other link state routing protocols (e.g., OSPFv3 (Open Shortest Path First version 3), EIGRP (Enhanced Interior Gateway Routing Protocol) may be used without departing from the scope of the invention.

Data packets arriving at an edge port (e.g., switch 22) of the DCE network 10 are encapsulated and delivered to another edge of the network (e.g., switch 24). The encapsulated header includes switch-IDs as the source and destination addresses. There is a one-to-one mapping between the system-ID and switch-ID. The switch-ID may be generated by a DRM (DCE Resource Manager) and is flooded to all DCE IS-IS nodes. For each DCE node, the switch-ID value is the same across topologies and preferably retained during a reboot. Frames are forwarded through the DCE network 10 based on switch-ID lookups. In one embodiment, these switch-ID based forwarding entries are learned, distributed, and populated in the RIBs (Routing Information Bases) by DCE IS-IS.

The destination MAC address for multicast CE frames is copied during encapsulation and forwarding takes place on group destination MAC addresses. In multicast DCE, per-vlan multicast group MAC state is maintained in the core, unlike unicast where the core switches maintain only switch-ID based forwarding state. This is used to forward multicast traffic only to interested edges, instead of flooding the traffic throughout the core. Multicast protocol thus builds state in the core. In one embodiment, IS-IS is used to build state in the core for the multicast protocol. IS-IS is used for disseminating and populating multicast state in conjunction with an IGMP-snooping feature which learns multicast state on the edges, described below.

IS-IS detects changes in the network topology and calculates loop free routes to other nodes in the network. Each router maintains a link-state database that describes the state of the network. Each router is also responsible for updating the state of the links adjacent thereto. The IS-IS protocol floods the link-state information across the network 10. The routers each send hello packets on the DCE core links 31, 32, 33, 34, 35, 36, 37, 38 to discover neighbors. When a neighbor is discovered, an adjacency is created. The router also sends advertisements and updates to the link-state database through all of the existing adjacencies.

From the link-state database, each switch 21, 22, 23, 24, 25 calculates the shortest path to each node with itself as the root. This gives the route to each destination in the network. When every router in the network has learned the network topology and calculated the shortest path to every node, the system is fully converged. Additionally, each switch also computes broadcast and multicast graphs rooted at other nodes to help forward multicast packets in a load shared manner (described below).

Figure 2:
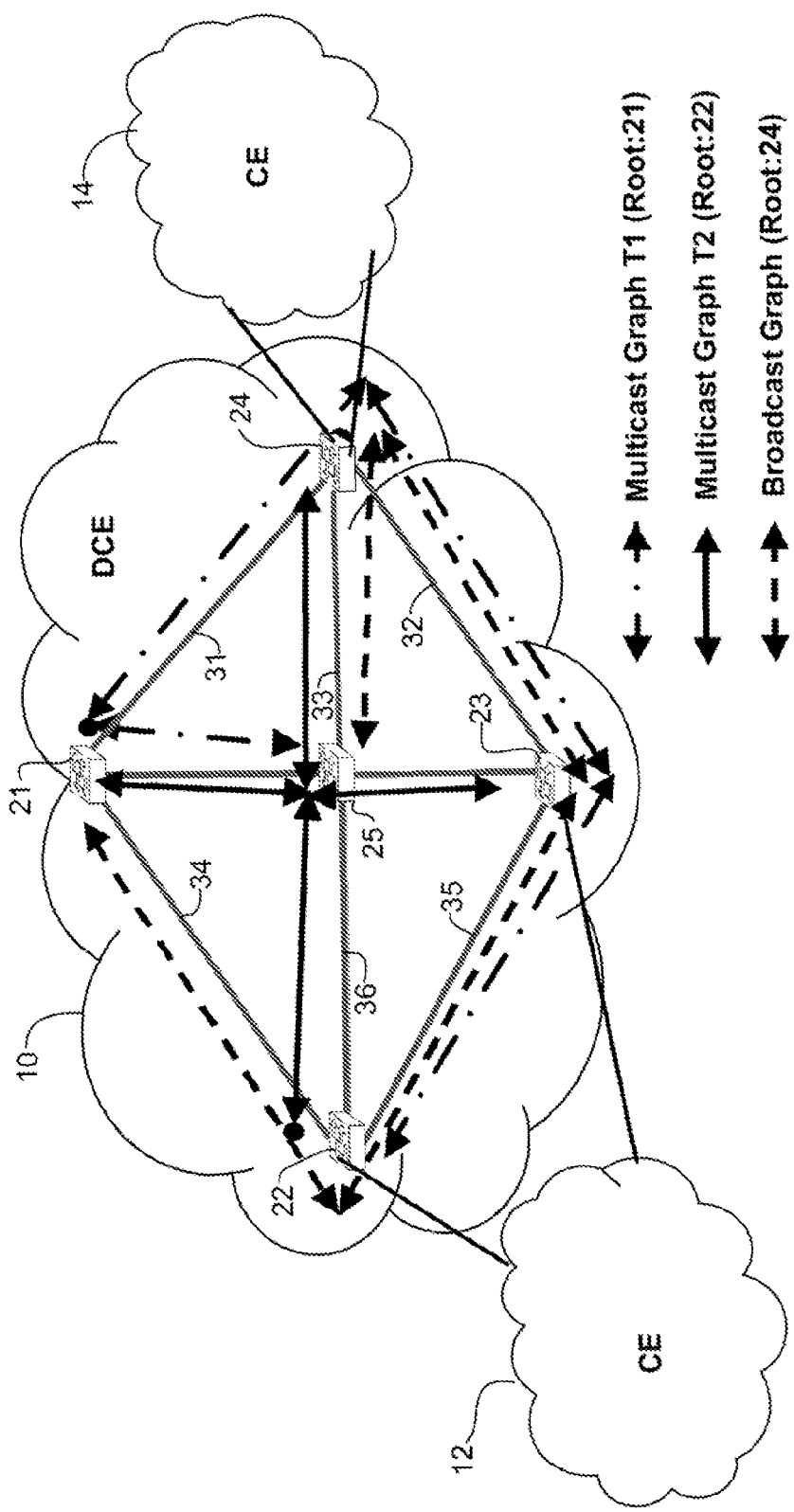
FIG. 2 illustrates multicast and broadcast graphs in the network of FIG. 1.

In each topology, a broadcast graph is created by default to carry broadcast traffic and unknown unicast traffic. The graph is similar to spanning tree, where all members of the nodes are reachable only once. The term graph is used herein to distinguish from group-based entries installed for multicast forwarding, which are referred to as trees. FIG. 2 shows a broadcast graph with switch 24 at the root of the tree.

Each topology also has multicast graphs associated therewith for use in multicast forwarding, with load sharing of multicast traffic. In one embodiment, two shared multicast graphs are created for each topology. The network shown in FIG. 2 has two multicast graphs T1, T2. Multicast graph T1 is located with a root at switch 21. Multicast graph T2 is located with a root at switch 22. As described further below, the multicast graphs provide multipath services for multicast frames in the topology.

Each switch announces a broadcast root priority and multicast root priority in a Topology Identifier (TLV). An ordered list is formed from these announcements, with ties being broken based on lower IS-IS system-IDs. Once a node receives all of the LSPs in the network, IS-IS runs an election algorithm on all eligible switches, independent from the other switches in the network, to determine the broadcast root of the topology. The node that announced the lowest priority in this broadcast list becomes the root of the broadcast graph. The broadcast graph is computed by default and control plane state is populated. The broadcast graph computation involves a SPF (Shortest Path First) run with the broadcast root as the root node and computation of the flood port list. The elected broadcast root selects the multicast roots based on the multicast priority advertised in the TLVs. The elected broadcast root node then decides on the number of multicast graphs to be computed for the topology and obtains and announces their forwarding tag (FTAG) values and roots. The broadcast root node announces the multicast root nodes and corresponding multicast FTAG identifiers in an LSP. The FTAG values may be obtained from the DRM and the announcement may take place in the multicast root sub-tlv of the TLV, for example. Upon receipt of the multicast TLV, the nodes independently compute the multicast graphs.

Once the multicast roots are known, IS-IS runs individual SPFs with each multicast root as the SPF root node and computes routes to each of the switches. After the graph computation is complete, the routes are updated in a routing information base referred to herein as M2RIB (Multicast Routing Information Base). M2RIB is a DCE Multicast Routing Information Base component which stores broadcast and multicast state. FIG. 3 illustrates an example of tables stored in the M2RIB at switch 24 for the multicast graphs T1, T2 shown in FIG. 2. The table for Graph T1 indicates reachability to each destination switch (21, 22, 23) from switch 24 on multicast graph T1. The table for Graph T2 indicates reachability to each destination switch (21, 22, 23) from switch 24 on multicast graph T2. Entries in the M2RIB may be in the following form:

FTAG,{dest-Switch0ID→Next-hop-Switch-Id}

Active VLANs may be installed for each graph in the form:

{FTAG,VLAN-set,Activate/Deactivate}

IS-IS also computes the switch-ID reachability for each node in the network based on the topologies described by the LSPs and sends updates to the DCE U2RIB (Unicast Routing Information Base). An example of a route entry in the U2RIB is:

{Topology-ID,VLAN,Switch-ID}--->{Next-hop-Switch-Id,Next-hop OIF}

Multicast group membership (or group and source membership) are learned via snooping on the edge switches which are directly connected to hosts which send IGMP (or MLD) reports. IGMP snooping performed at the edges of the DCE network restricts multicast traffic flow in the core to reach only those edges that have multicast receivers. The presence of L3 routers are also learned by these edge switches by detecting the standard Multicast Router Detection (MRD) or other prevalent methods (e.g., snooping on PIM hello messages or IGMP/MLD query messages). This snooped information is relayed to the IS-IS running on the same edge-switch which in turn advertises these locally-joined multicast group/source, group information using link state flooding to the L2 IS-IS core. A new PDU type (group membership LSP or GM-LSP) may be used to advertise this multicast information. All of the switches running L2 IS-IS receive these GM-LSPs and the fact that the switch which originated this GM-LSP has receivers behind them. The switches build multicast group state (or group and source state) and the corresponding outgoing-interface list (OIF list) based on how they can reach the originating switch using the routing table information.

IGMP snooping keeps track of the edge ports that have multicast hosts and routers, and the groups they are interested in. This information is relayed to IS-IS, which distributes it to all switches in the DCE network, using GM-LSP flooding. IGMP communicates with IS-IS through the M2RIB. IGMP adds the multicast information learned on the edge ports to M2RIB. This information is notified by M2RIB to IS-IS, which originates GM-LSPs accordingly and floods it. When IS-IS learns multicast information via receipt of GM-LSP on its core ports, it is added to M2RIB. IGMP snooping provides updates to M2RIB as follows:

{VLAN}→{enable|disable}

{VLAN,Source,Group}→{OIF-list}

The "enable/disable VLAN" update is used to enable/disable IGMP snooping in the VLAN.

In one embodiment, the M2RIB converts IP addresses to MAC addresses and installs Group MAC (GMAC) based entries. The M2RIB also notifies IS-IS about IGMP snooped GMACs.

In one embodiment, IS-IS announces GMACs in GM-LSPs. At receiving nodes, IS-IS updates the M2RIB. The following is an example of a format for multicast group updates from IS-IS to M2RIB:

{VLAN,Source,Group}→{SwitchID List}

The multicast topology graphs built by IS-IS to carry multicast traffic are provided to M2RIB so that the traffic can be forwarded on one of the topologies. The M2RIB holds the complete database of the per-vlan multicast groups and the interested member ports and programs the DCE hardware tables to do the appropriate forwarding.

The following describes an example of process flow during initialization and port bringup at a node. During initialization in the DCE network, a node obtains router-MAC addresses, acquires CLI configurations for DCE topologies and requests future notifications. The node also queries a VLAN manager and requests VLAN notifications. The node obtains a local switch-ID from the DRM and any relevant DCE IS-IS interface configurations. During port bringup, the node exchanges hellos and forms adjacencies. LSP database is exchanged and the DRM is notified of newly learned switch-ID and FTAGs. Neighbor reachability is also passed on. SPF is run on the LSP database for affected topologies. The broadcast root is then selected from the reachable nodes and the multicast root TLV is generated with FTAG values. Broadcast and multicast graphs, and the U2RIB and M2RIB are updated, as required.

Figure 4:
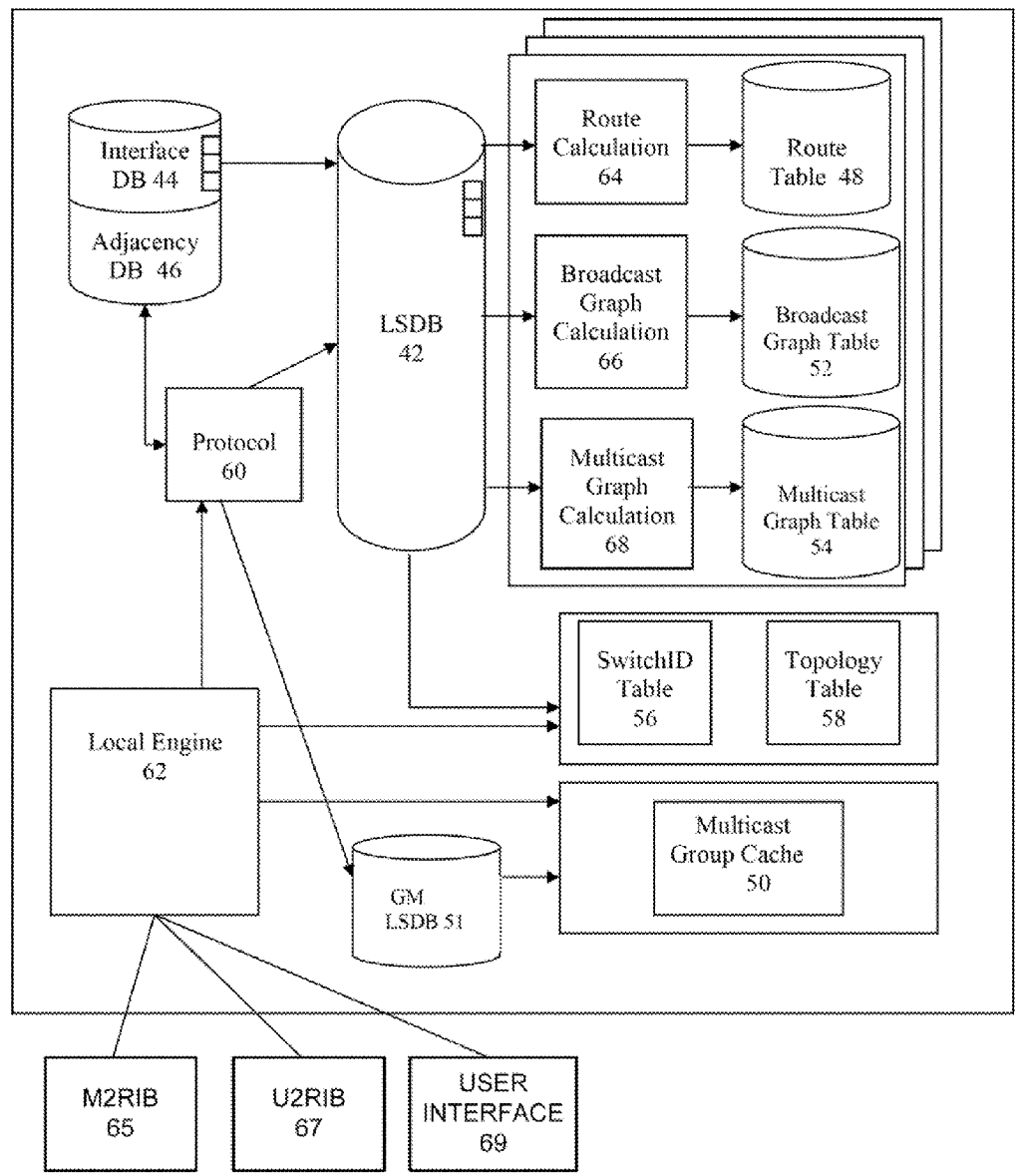
FIG. 4 is a block diagram illustrating an example of components operable at a node of the network.

FIG. 4 is a block diagram illustrating the functional architecture of a DCE IS-IS component located at one of the nodes in the DCE network, in accordance with one embodiment. The IS-IS component may be configured to run in each VDC (Virtual Device Context). A single multi-threaded process in each VDC can run multiple instances of the IS-IS protocol engine, where each instance encompasses multiple topologies.

The link-state database (LSDB) 42 stores LSPs (Link State Packets). The interface database (DB) 44 stores the configured interfaces. The database 44 contains a list of interfaces configured, along with any IS-IS parameters, such as metric on each topology allocated therewith. An adjacency database 46 holds the state of each discovered adjacency and is related to the interface database 44 as every adjacency is associated with an interface.

A route database 48 includes a unicast route table and a multicast route table. The unicast route table contains routes calculated by DCE IS-IS based on the network topology described by the LSPs. The ECMP routes with respect to the Topology-ID, VLAN, switch-ID, and next-hop switch information is fed to the U2RIB 67. The multicast route table contains multicast routes learned by external GM-LSPs and internal M2RIB notifications. As previously discussed, the routes may be in the form {VLAN, Source, Group}→{SwitchID-List}, where the 'Source' and 'Group' are MAC-based entries.

A broadcast graph table 52 contains the interfaces that are marked as router ports and designated ports based on the local switch's position in the network-wide agreed broadcast graph (which may be rooted elsewhere). The multicast graph table 54 contains the interfaces that are marked as root ports and designated ports based on the local switch's position in the network-wide agreed multicast graphs (which may be rooted elsewhere). As discussed above, the DCE IS-IS protocol allows for all nodes to agree on a root for the broadcast graph and roots for the multicast graphs.

IS-IS maintains a switch-ID table 56, which contains the mapping between the system-IDs and the switch-IDs announced by each IS-IS node, and their various states (e.g., primary/secondary, tentative/confirmed). IS-IS also maintains a topology table 58 which includes topology to FTAG(s) mappings and topology to vlan-set mappings. A protocol state machine 60 is responsible for sending hello packets, establishing adjacencies, and running an adjacency and interface state machine. The protocol state machine 60 interfaces with the LSDB 42 and a GM LSDB 51. The GM LSDB provides input to a multicast group cache 50. As the protocol progresses, the protocol state machine 60 modifies the interface and adjacency databases 44, 46 accordingly. The protocol subsystem 60 is also responsible for LSDB synchronization, protocol extensions, and reliably flooding DCE application TLVs. A local engine 62 handles interactions with various components such as the CLI, DRM, M2RIB 65, U2RIB 67, IM, and VLAN-MGR to obtain various data that IS-IS is interested in. The data may include: topology configuration and its properties (interfaces/metrics); VLAN states; local switch IDs/FTAGs; local multicast group memberships learned by IGMP snooping; and DCE interface states, for example.

Route calculation and graph calculation components 64, 66, 68 are responsible for running SPF computations and generating proper routes from contents of the LDSB 42. The route calculation component 64 uses Dijkstra algorithm for computing the shortest path to each switch in the network. The broadcast graph calculation and multicast graph calculation components 66, 68 use Dijkstra algorithm for computing the position of the node with respect to other nodes in the network for a given graph. A route distribution subsystem (not shown) is responsible for inter-level routes advertisement. The route distribution subsystem also uses route information from different levels and user configured route-map to inject reachability information into LSP for other routes.

The system may include a user interface 69 for configuring the topologies with the appropriate VLANs and configuring IS-IS on a given interface, for example.

Figure 5:
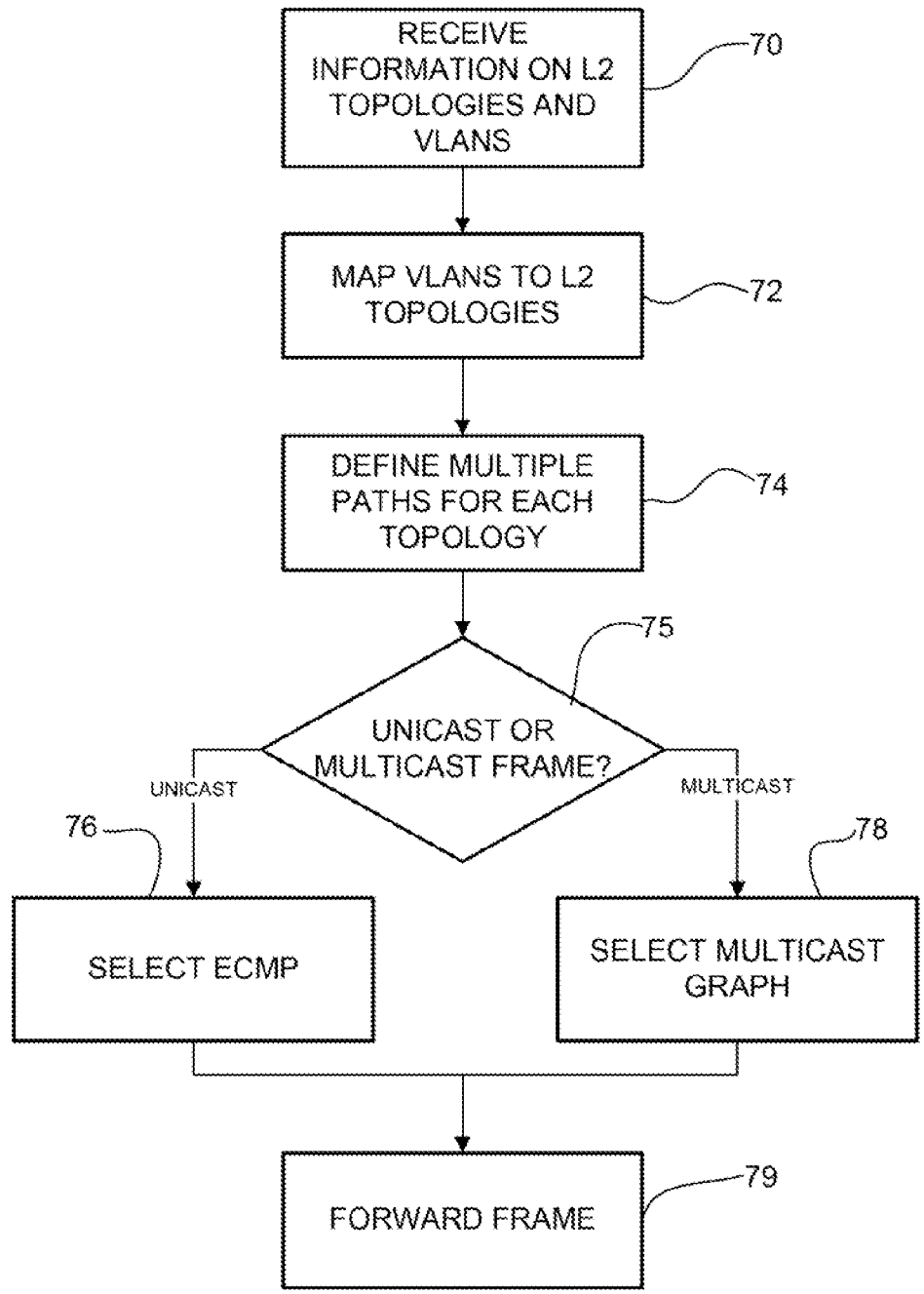
FIG. 5 is a flowchart illustrating a process for providing differentiated services for unicast and multicast frames in a layer 2 topology.

FIG. 5 is a flowchart describing one example of a process for providing differentiated services for unicast and multicast frames in L2 topologies. At step 70, topology and VLAN information is received at a node (e.g., edge switch 22), as previously described. At step 72, VLANs (e.g., vlan-sets) are mapped to L2 topologies. This step includes cases wherein mapping information (e.g., user configurations, VLAN to topology mappings generated at other nodes) is received at the node. As previously described, the VLANs may be grouped into vlan-sets, with each vlan-set mapped to a topology. After the VLANs are aggregated into various topology buckets, multiple paths are defined for each topology to provide multipathing services on each topology (step 74). As described in detail below, this involves defining ECMPs for unicast frames and multicast graphs for multicast frames. Unicast frames (packets) received at the node are forwarded through the DCE network 10 using the ECMPs (steps 75, 76, and 79). Multicast frames (packets) received at the node are forwarded through the DCE network 10 on selected multicast graph (steps 75, 78, and 79). The ECMP or multicast graph is selected based on the VLAN (or vlan-set) associated with the packet. The associated VLAN may be identified in the packet header or identified based on the source of the packet. Selection of the ECMP or multicast graph preferably also takes into account load balancing requirements. Details of steps 72-79, in accordance with example embodiments, are described below.

The following describes two embodiments for running an L2 IS-IS control protocol and aggregating VLANs. In the first embodiment, each vlan-set (range of VLANs) has a metric-associated therewith. For example, vlan-set 1-50 and vlan-set 51-100 can run on the same interface with different metrics. Each vlan-set is encoded as a separate topology in an LSP so that the metric differences provide path diversity for traffic among the different vlan-sets. In this embodiment, each vlan-set (or a group of disjoint vlan-sets) is represented by a topology and advertised in the LSP database. It is possible to have multiple non-contiguous VLANs (or multiple disjoint vlan-sets) in the same topology. User configuration is provided for this embodiment.

In the second embodiment, each process (VDC (Virtual Device Context)) supports a single topology which in turn supports the entire vlan-set (range of VLANs). This embodiment can be used in the absence of user configuration (zero-configuration default setting).

The following is a sample configuration in which various VLANs are mapped to respective topologies in a VDC:

| vlan-set | 1-50 | topology blue |
| vlan-set | 51-100 | topology red |
| vlan-set | 101-4000 | topology base |

All interfaces of a node belong to the base topology with a default metric. It is possible to assign interfaces to other topologies with different metrics. If the topologies are not configured, the default metric may be (MAX_LINK_COST) in any topology other than the base topology. The interfaces may thus be configured as follows:

| | Interface 1 | Interface 2 |
|---|---|---|
| topology blue | metric 5 | N/A (not configured) |
| topology red | metric 3 | metric 1 |
| topology base | metric default | metric default |

As a result of the above configuration, for topology blue, the shortest paths to all nodes are reachable through only interface 1, and if that interface goes down, they are not reachable at all. For topology red, the shortest paths to all nodes are reachable through interface 2 because of the lower metric. If interface 2 goes down, vlan-set 51-100 uses interface 1. There are default metric values associated with all interfaces for the vlan-set that belongs to the base topology. The use of multi-topologies allows for traffic/metric engineering. By grouping VLANs in a topology, system resources in terms of the number of SPF runs, hardware entries, etc. are reduced and scalability is improved. The embodiments described herein also support a configuration where one VLAN maps to one topology, thereby providing path diversity and other differentiated services for traffic within a single VLAN.

After the VLANs are aggregated into various topology buckets, multipathing services are provided for unicast and multicast frames within the L2 IS-IS network. This step is described first for unicast and then for multicast.

In order to define the multiple paths for unicast frames, Dijkstra algorithm is run using available topology information, and a switch-ID forwarding/routing table is computed. The SPF run on a link state protocol produces ECMPs between various nodes in the L2 IS-IS network. This computation thus allows for efficient use of the L2 IS-IS network core bandwidth. The routes obtained per topology can be used to minimize the hardware logic needed to provide services on the aggregated topology level rather than at a VLAN level. The ECMPs for each topology may also be obtained using routing protocols other than IS-IS.

In order to define multiple paths for multicast frames, a routing protocol (e.g., IS-IS) builds N spanning trees to generate the multicast graphs for use in multicast forwarding. In one embodiment, the multicast graphs (spanning trees) are generated by running Dijkstra algorithm with N different nodes as a root node. This results in N separate switch-ID forwarding/routing tables. The root nodes for the N multicast graphs may be chosen via a static configuration on each of the nodes, or via a dynamic root election method wherein each node advertises the number of roots it can support and its own root priority in each topology in its LSP. Each node can then decide on the value of N for the number of graphs (trees) and the root node for each graph based on the announced priorities. Each tree is assigned a tree-ID which is seen consistently in all nodes. The tree-ID is used as part of the forwarding lookups. In one embodiment, IS-IS builds routes of the following form for each of the N tree-IDs and each of the IS-IS nodes:

{tree-id,node-id};{nexthop-interface}

Once these N multicast graphs are built in the topology, they are used to build multicast forwarding entries based on the multicast group based state learned via IS-IS group membership LSPs. This may be performed, for example, in accordance with TRILL (Transparent Interconnection of Lots of Links).

In one embodiment, multicast packet forwarding in the L2 IS-IS network uses an encapsulation which contains the tree-id to identify which multicast graph (spanning tree) is to be used to forward the packet. The edge switch that receives a multicast frame (data packet) from a source node picks one of the N multicast spanning trees to do the forwarding. This selection may be based on a hashing mechanism based on the group, source tuples and is preferably chosen in order to do efficient load balancing. Once a tree-ID is selected and placed into the packet header, the subsequent switches in the path to the receivers do not modify the tree-ID, but instead do their lookups for the tree-ID and forward on the same tree (multicast graph). Use of the hash method ensures traffic with different multicast source/destinations in the same L2 topology use different multicast trees for forwarding, thereby ensuring use of multiple paths. Once the tree-ID is determined, the node performs a destination lookup in the routing table for the corresponding tree.

Figure 6:
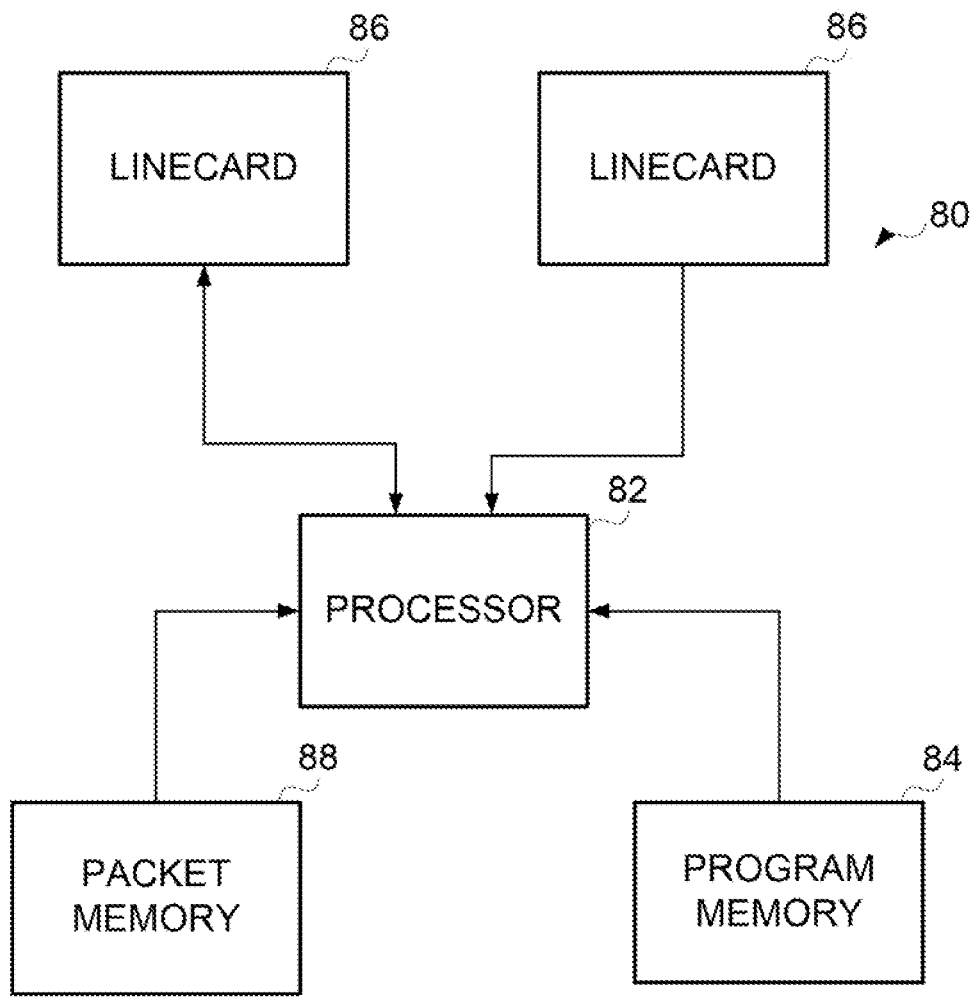
FIG. 6 depicts an example of a network device useful in implementing embodiments described herein.

FIG. 6 depicts a network device 80 that may be used to implement embodiments described herein. Network device 80 is configured to implement all of the network protocols and extensions thereof described above. In one embodiment, network device 80 is a programmable machine that may be implemented in hardware, software, or any combination thereof. Logic may be encoded in one or more tangible media for execution by a processor. For example, processor 82 may execute codes stored in a program memory 84. Program memory 84 is one example of a computer-readable medium. Program memory 84 can be a volatile memory. Another form of computer-readable medium storing the same codes is a type of non-volatile storage such as floppy disks, CD-ROMs, DVD-ROMs, hard disks, flash memory, etc.

Network device 80 interfaces with physical media via a plurality of linecards 86. Linecards 86 may incorporate Ethernet interfaces, DSL interfaces, Gigabit Ethernet interfaces, 10-Gigabit Ethernet interfaces, SONET interfaces, etc. As packets are received, processed, and forwarded by network device 80, they may be stored in a packet memory 88. To implement functionality according to the system, linecards 86 may incorporate processing and memory resources similar to those discussed above in connection with the network device as a whole. It is to be understood that the network device 80 shown in FIG. 6 and described above is only one example and that different configurations of network devices may be used.

As can be observed from the foregoing, the embodiments described herein provide numerous advantages. The use of a link state protocol such as IS-IS at the control plane enables multipathing at the L2 network. Furthermore, by aggregating vlan-sets to a topology, it is possible to provide differentiated services to a group of VLANs, while making the hardware less expensive by performing lookup of entries at topology granularity as opposed to VLAN granularity.

Although the method and apparatus have been described in accordance with the embodiments shown, one of ordinary skill in the art will readily recognize that there could be variations made to the embodiments without departing from the scope of the present invention. Accordingly, it is intended that all matter contained in the above description and shown in the accompanying drawings shall be interpreted as illustrative and not in a limiting sense.

What is claimed is:

1. A method comprising:
   receiving at a network device in a core network, information on layer 2 topologies and Virtual Local Area Network (VLAN) sets, said layer 2 topology comprising nodes and metrics for links connecting the nodes, said VLAN set comprising a group of VLANs configured to use similar services in the core network;
   mapping said VLAN sets to said layer 2 topologies to provide differentiated services in said layer 2 topologies;
   defining multiple paths for each of said layer 2 topologies to provide multipath services on each of said layer 2 topologies, said multiple paths comprising Equal Cost Multipaths (ECMPs) for unicast frames and multicast graphs for multicast frames; and
   forwarding a packet received at the network device on one of said multiple paths defined for said layer 2 topology mapped to said VLAN set associated with the packet.

2. The method of claim 1 wherein the core network comprises a Data Center Ethernet (DCE) network and said one or more VLANs are associated with Classical Ethernet (CE) networks in communication through the DCE network.

3. The method of claim 1 wherein the packet is a unicast frame and defining multiple paths comprises defining Equal Cost Multipaths (ECMPs).

4. The method of claim 1 wherein the packet is a multicast frame and defining multiple paths comprises defining two or more multicast graphs.

5. The method of claim 1 wherein said topology information comprises a topology configuration including interfaces at the nodes.

6. The method of claim 1 wherein defining multiple paths comprises computing a forwarding table for each of said layer 2 topologies.

7. The method of claim 1 wherein defining multiple paths comprises building a broadcast graph and multicast graphs for each of said layer 2 topologies.

8. The method of claim 7 wherein building a broadcast graph comprises receiving link state packets and running an election algorithm to select a broadcast root node for said broadcast graph.

9. The method of claim 7 wherein building said multicast graphs comprises receiving a packet from a broadcast root node of said broadcast graph identifying multicast root nodes of said multicast graphs.

10. The method of claim 7 wherein building each of said multicast graphs comprises running a shortest path first algorithm to define a spanning tree.

11. The method of claim 7 further comprising installing said multicast graphs in a routing information base.

12. The method of claim 7 wherein forwarding the packet comprises encapsulating the packet with a header identifying one of said multicast graphs.

13. The method of claim 1 wherein said layer 2 network is an Intermediate System to Intermediate System (IS-IS) network.

14. The method of claim 13 wherein forwarding the packet comprises utilizing an IS-IS control plane.

15. An apparatus comprising:
   a database for storing information on layer 2 topologies and Virtual Local Area Network (VLAN) sets in a core network, said layer 2 topology comprising nodes and metrics for links connecting the nodes, said VLAN set comprising a group of VLANs configured to use similar services in the core network; and a processor for mapping said VLAN sets to said layer 2 topologies to provide differentiated services in said layer 2 topologies, defining multiple paths for each of said layer 2 topologies to provide multipath services on each of said layer 2 topologies, and forwarding a packet received at the apparatus on one of said multiple paths defined for said layer 2 topology mapped to said VLAN set associated with the packet;

wherein said multiple paths comprise Equal Cost Multi-paths (ECMPs) for unicast frames and multicast graphs for multicast frames.

16. The apparatus of claim 15 wherein the core network comprises a Data Center Ethernet (DCE) network and said VLANs are associated with Classical Ethernet (CE) networks in communication through the DCE network.

17. The apparatus of claim 15 wherein the packet is a unicast frame and said multiple paths comprises Equal Cost Multipaths (ECMPs).

18. The apparatus of claim 15 wherein the packet is a multicast frame and said multiple paths comprises two or more multicast graphs.

19. The apparatus of claim 15 wherein said multiple paths comprise multicast graphs and further comprising a table for storing said multicast graphs.

20. Logic encoded on one or more non-transitory computer readable media for execution and when executed operable to:

receive in a core network, information on layer 2 topologies and Virtual Local Area Network (VLAN) sets, said layer 2 topology comprising nodes and metrics for links connecting the nodes, said VLAN set comprising a group of VLANs configured to use similar services in the core network;

map said VLAN sets to said layer 2 topologies to provide differentiated services in said layer 2 topologies;

define multiple paths for each of said layer 2 topologies to provide multipath services on each of said layer 2 topologies; and forward a packet on one of said multiple paths defined for said layer 2 topology mapped to said VLAN set associated with the packet:

wherein said multiple paths comprising Equal Cost Multi-paths (ECMPs) for unicast frames and multicast graphs for multicast frames.

* * * * *